United States Patent
Neuman

[11] 3,993,904
[45] Nov. 23, 1976

[54] LOW-COST BUT ACCURATE RADIOACTIVE LOGGING FOR DETERMINING WATER SATURATIONS IN A RESERVOIR

[75] Inventor: Charles H. Neuman, Placentia, Calif.

[73] Assignee: Chevron Research Company, San Francisco, Calif.

[22] Filed: Mar. 31, 1975

[21] Appl. No.: 563,922

[52] U.S. Cl. .............................. 250/258; 250/253; 250/270
[51] Int. Cl.² ........................................ G01V 5/00
[58] Field of Search ........... 250/258, 259, 262, 270, 250/253

[56] References Cited
UNITED STATES PATENTS

| | | | |
|---|---|---|---|
| 2,991,364 | 7/1961 | Goodman | 250/262 |
| 3,562,523 | 2/1971 | Richardson | 250/259 |
| 3,748,474 | 7/1973 | Murphy | 250/259 |
| 3,757,575 | 9/1973 | Murphy et al. | 73/152 |
| 3,812,353 | 5/1974 | Gilchrist | 250/258 |
| 3,817,328 | 6/1974 | Neuman | 73/152 |
| 3,825,752 | 6/1974 | Murphy et al. | 250/258 |

Primary Examiner—Harold A. Dixon
Attorney, Agent, or Firm—R. L. Freeland, Jr.; H. D. Messner

[57] ABSTRACT

A method is disclosed for determining water saturation in a petroleum reservoir using logging signals indirectly related to the abundance of oxygen nuclei in the reservoir rock. The first step of the invention is to record a log sensitive to the abundance of oxygen nuclei, after the region surrounding the well bore is caused to have fluid saturations representative of the bulk of the reservoir. A purposeful change is then made in the fluid saturations in the region surrounding the well bore by injecting a liquid capable of displacing substantially all of the original fluids. The log is recorded a second time. The displacing fluid is then itself displaced by brine, and a third log is recorded. Water saturation is then determined from differences between the logs and from known fractional volume oxygen contents of the reservoir brine and the first injected liquid. It is not necessary that the log responses be independent of the material in the borehole, the casing, the casing cement, or the reservoir rock. It is only necessary that changes in formation content cause proportional changes in log responses.

14 Claims, 4 Drawing Figures

LOW-COST BUT ACCURATE RADIOACTIVE LOGGING FOR DETERMINING WATER SATURATIONS IN A RESERVOIR

RELATED APPLICATIONS

The following applications filed concurrently herewith and assigned to the assignee of the present application are incorporated herein by reference: (1) Ser. No. 563,921, for "Radioactive Logging for Determining Oil Saturation in a Reservoir", Charles H. Neuman; and (2) Ser. No. 563,923, "Radioactive Logging for Determining Gas Saturation in a Reservoir", Charles H. Neuman.

FIELD OF THE INVENTION

This invention relates to radioactive logging methods. More particularly, it relates to the use of signals indirectly related to oxygen nucleus concentrations to determine the fractional content of water in a porous petroleum reservoir rock containing oil, water, and gas.

BACKGROUND OF THE INVENTION

Economic feasibility of methods for secondary and tertiary recovery of petroleum often depends on accurate measurement of the quantity and location of reservoir water in a formation after previous recovery processes have been completed. Such measurements are desirably carried out in "old" wells, i.e., in wells used to produce the formation. Reasons: (i) accuracy is increased; and (ii) costs are decreased; the process of drilling a new well displaces some fraction of the formation fluids originally in the formation away from the hole, and it is desirable to evaluate the potential recovery from a reservoir without incurring the expenses of drilling a new well.

In my U.S. Pat. No. 3,817,328 for "Neutrons Absorption and Oxygen Log for Measuring Oil Content of Formations", June 18, 1974, assigned to the assignee of this application, I describe a method for accurately determining the oil content of a reservoir containing both mobile oil and a significant gas saturation. The first step was the recording of the response of both thermal-neutron-decay-time log and a neutron-activated-oxygen log to a formation penetrated by a well bore. A purposeful change was then made in the oil saturation in a given region of the formation surrounding the well bore by injecting fluid under sufficient pressure to displace the connate fluids. The change should remove substantially all the oil or remove as much oil as could be displaced by a proposed flooding technique. The combination of the thermal-neutron-decay-time log and the oxygen log was then run again to record the response of the same given region. The difference in the oil content around the well bore was determined from the differences between the two sets of logs.

My method may be somewhat limited, however, by the requirement that the oxygen activation log be calibrated at least to the extent that changes in log readings be proportional to changes in the oxygen content of the reservoir fluids with a predetermined single constant or proportionality. The responses from logging tools currently available are unduly influenced—in some applications—by the pipe, cement and liquids in the well bore bore; experience has shown that calibration valid at all depths in the well is difficult (if not impossible) to achieve in such applications.

Also many oil reservoirs, e.g., the SACROC field in the West Texas region of the United States, present additional problems in attempting to measure water saturation in and around existing wells; while the production brine may be saline enough in such reservoirs that conventional methods could work, the brine in the formation is often significantly different between producing intervals. Reason: it has been common practice for secondary recovery purposes to inject brine with salinity different from that in the virgin reservoir. At a later time when an accurate measurement of formation water is desired, the salinity of the water in the formation—a function of the degree of flushing of the injected water—is different from interval to interval within the reservoir.

Conventional techniques have also provided several logs which serve as useful fluid indicators (including formation water) which could be run through casing, and which are based on measurements reflecting the abundance of elements other than chlorine. These include logs designed to reflect the activation of oxygen nuclei as well as logs designed to measure the inelastic scattering of nuclei by carbon and oxygen. Oxygen abundance can also be gained from background correction applied to some versions of pulsed-neutron-capture logs. But the recorded signals from each of the logging devices required to carry out the above-mentioned methods only indicate the presence of formation fluids such as water, rather than its abundance, mainly due to difficulty in separating responses due to oil from those associated with the formation water.

In summary, the existing prior art methods of which I am aware are not quantitative enough to provide accurate determination of the frictional content of water in a reservoir rock containing oil, water and gas, especially if the formation brine is nonsaline and/or has been varied by previous waterfloods.

OBJECT OF THE INVENTION

It is the object of the present invention to provide a novel method for accurately measuring water saturation in a formation penetrated by a well bore using logs that produce signals that not only vary linearly with fluid saturations but in a manner associated with other properties of the well bore and rock matrix, such that general calibration (and recalibration) of the logging tool that provide the logs is unnecessary.

SUMMARY OF THE INVENTION

In accordance with the present invention, signals indicative of the oxygen nucleus concentrations in a porous reservoir rock containing oil, water and gas are obtained using a radioactive logging tool in a manner that allows the omission of general calibration (and recalibration) of the tool that provides the logs, even in application where the reservoir is nonsaline or where the formation brine has been significantly varied by previous waterfloods.

The first step is to record the response of a log sensitive to the oxygen nuclei in the rock, for example, an oxygen log, a carbon/oxygen-ratio log, or a pulsed-neutron-capture log, in a manner that assures that the fluid saturations around the well bore represent those in the bulk of the reservoir. The next step consists of making a purposeful change in the region surrounding the well bore by injecting a sufficient quantity of a chemical solvent or combination of solvents to displace substantially all of the formation fluids far enough away from the well bore such that the displaced water formation cannot be detected by the logging tool. The log is then run again. The chemical solvent is then displaced itself by brine of known saline concentration. Then the log is run a third time. Thereafter, the water content of the reservoir is accurately determined from the log responses combined with known properties of the fluids. During the logging steps, the tool does not undergo general calibration (or recalibration), since the present invention involves the utilization of the differences between, rather than the absolute magnitudes of, the log signals.

Further objects, features and advantages of the present invention will become more apparent to those skilled in the art from a detailed reading of the following description of preferred embodiments thereof, when taken in consideration with the accompanying drawings.

PREFERRED EMBODIMENTS OF THE INVENTION

Figure 1:
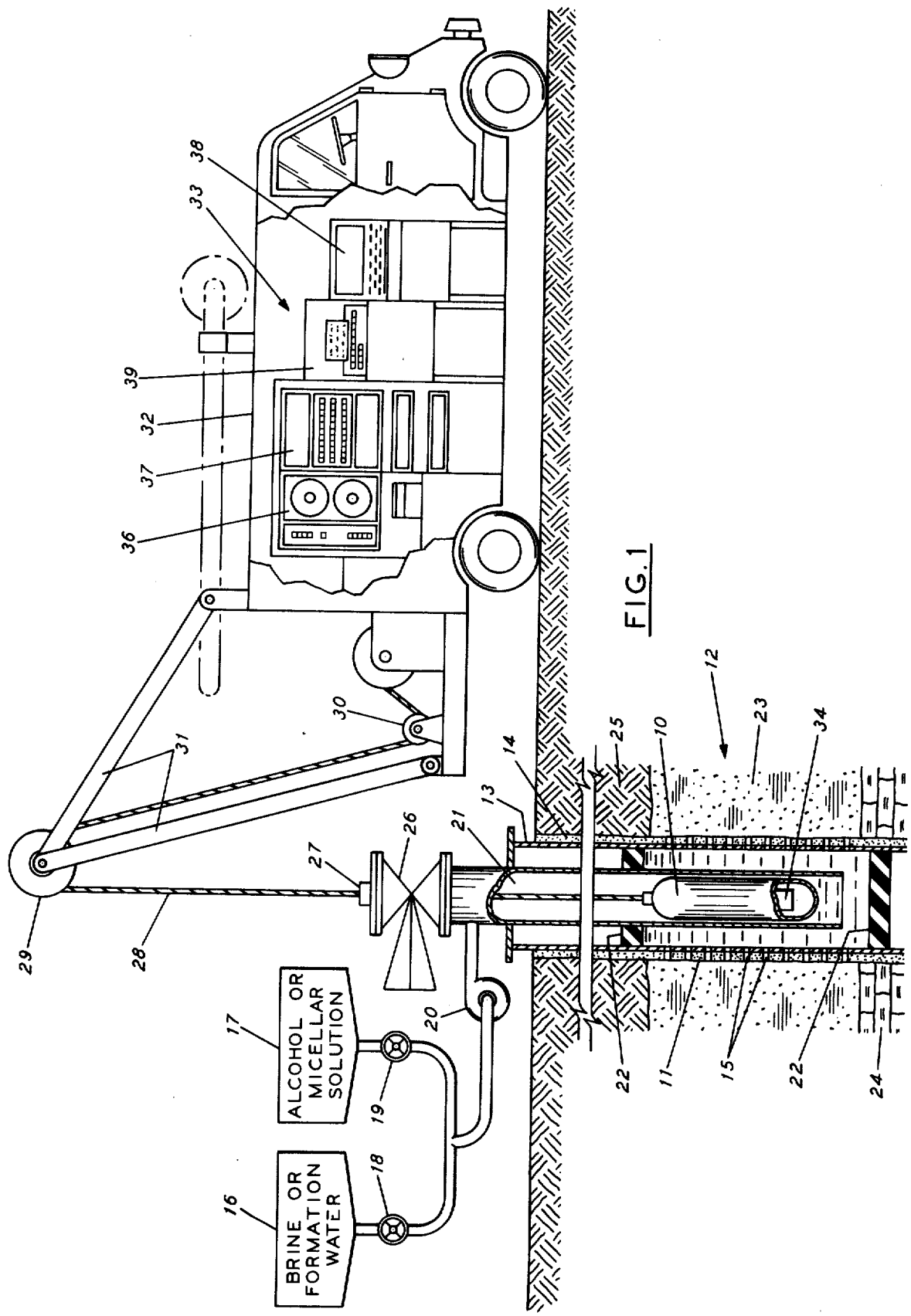
FIG. 1 is a side elevation of a borehole penetrating a reservoir partially cut away to illustrate a logging sonde connected uphole to a logging truck for carrying out radioactive logging of the reservoir for the determination of water saturation in the presence, say, of oil and/or gas.

Referring now to the drawings, particularly to FIG. 1, there is illustrated a radioactive well logging sonde 10 for carrying out a survey operation within the well bore 11 penetrating earth formation 12. The well bore 11 is cased with casing 13, sealed to the formation 12 by cement 14. The casing 13 is perforated to provide openings 15 for production of gas and oil from the formation 12, or for injection of fluids from source tanks 16 or 17 at the earth's surface. The passage of the injecting fluids is via valves 18, 19 and pump 20 at the earth's surface and thence downhole through the interior of tubing 21 into the formation 12.

In the arrangement shown, the tubing 21 is packed off from its upper and lower extremities by packers 22. The packers 22 allow the fluids to pass relative to a selected (and isolated) region of the formation 12, say into sandstone stratum 23 between carbonaceous and cap rock layers 24 and 25, respectively. At the earth's surface, the tubing 21 terminates in a connector 26 having an opening 27 through which a logging cable 28 passes. The cable 28 is reeled via sheaves 29 and 30 attached to supports 31 of a logging truck 32 for translation of the logging sonde 10 through the well bore 11.

Constructional characteristics of the cable 28 are conventional: it includes a plurality of weight-bearing members surrounding a series of conductors. A portion of the conductors is set aside for control purposes, which allows signals to pass from a control and processing unit 33 within the truck 32 downhole to a radioactive logging system 34 within the sonde 10. Another portion of the conductors is set aside for detection purposes which conduct detected signals representing various downhole conditions uphole from the logging system 34 to the control and processing unit 33. The detected signals form a log—in digital form—which represents various formation characteristics by which later mathematical processes for the present invention can be carried out.

Peripherals of the control and processing unit 33 can include a magnetic tape deck 36 where the log signals can be stored; after a multiplicity of signals have been received and stored, say from a plurality of logging runs, processing via processor 37 occurs. Of course, the signals of each logging run are identified on a selected track of the tape ("log") by logging run as well as by depth interval. Each data bit of each "log" is thus identifiable so as to be combinable with other information in the manner set forth.

Processor 37 is preferably a minicomputer (a relatively low-cost, small, short-word-length (12–16 bits), limited-core-storageable, microprogrammable device). Control of the processor 37 is provided by appropriate software in cooperation with keyboard terminal 38. Display of the results can occur at the keyboard terminal 38 or via printer 39.

Logging system 34 is controlled in concert with selected injection of fluids from source tanks 16 and 17 to provide meaningful logging measurements as the sonde 10 is translated through the well bore 11. Characteristics of the radioactive system 34 vary with the types of application and data to be indicated, but in general include a detector, a radioactive source and various shields. Most are operated in a manner so as to gate the detector means and provide one or more radioactive logs as a function of depth at uphole control and processing unit 33 within the truck 32. Among logging systems 34 available for use within the logging sonde 10 which have special relevance to the method of the present invention are the following: pulsed-neutron-capture and oxygen-activation logging systems. Such systems are individually available on a commercial basis and have in common a data output storable on a selected medium such as magnetic tape processable by associated equipment in a manner suitable for carrying out the method of the present invention.

Since the logs themselves are indicative of the operations of the elements which comprise each corresponding logging systems, a brief discussion of each log is in order and is presented below.

Pulsed-Neutron-Capture Log

Pulsed-neutron-capture logs are designed to accurately measure the rate of decay of thermal neutrons at a detector following an intense pulse from a high-energy neutron source. The detector is synchronized with the source to operate while the latter is off. The radiation detected can be either slow neutrons or gamma rays resulting from neutron capture; in either case, the signal response is related to the population of thermal neutrons in the formation surrounding the borehole. From the time the source is turned off, the slow neutrons are gradually captured and the amount of radiation detected per unit of time decreases until the source is again turned on. By measuring the number of thermal neutrons (or gamma rays produced by the thermal neutrons) present at any particular time, the rate of decay of the thermal neutron population may be measured. The rate of decay is dependent upon the nuclei of the material present in the formations and varies from formation to formation. This rate of decay is related to the time required for those nuclei to capture the thermal neutrons; therefore, the measurement is related to this time and hence to the lifetime of the neutrons in the formation.

Figure 2:
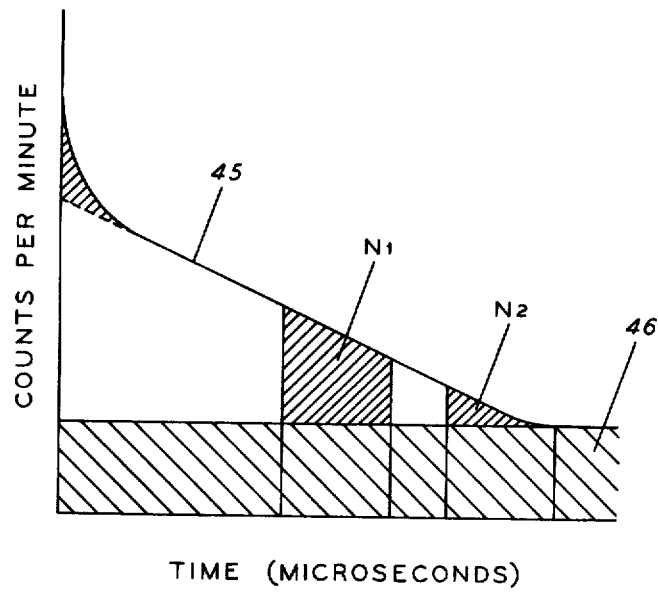
FIGS. 2 and 3 are characteristic amplitude-vs.-time decay waveforms provided by pulsed-neutron well logging means which could be used within the logging sonde of FIG. 1.

FIG. 2 illustrates the decline of the thermal neutron population as a function of time as measured by the number of thermal neutrons (or gamma rays produced by the thermal neutrons) that are present in the vicinity of the well bore. Thus, the rate of decay of curve 45 of FIG. 2 is dependent upon the nuclei of the material present in the adjacent formation.

Of particular importance in water saturation determinations are the oxygen-abundance signatures provided by monitoring the background indication of the above pulsed-neutron-capture logs. Returning to FIG. 2, background radiation appears in region 46 of the curve 45. Note in this regard that curve 45 results from utilization of a pair of counting-rate curves plus a curve indicative of the rate of decline of the neutron population. The early gate, $N_1$, portion of curve 45 is normally derived during the interval of 400 to 600 microseconds after time zero (the time of termination of the neutron pulse from the neutron source), and is a measure of the radiation intensity detected during that interval. A later gate, $N_2$, portion of the curve 45 is a similar measurement derived during the interval from 700 to 900 microseconds after time zero. By further modification in the manner taught in U.S. Pat. Nos. 3,705,304 and 3,706,884, extraction of the oxygen-abundance level of the surveyed formation fluids is possible, say from the relative intensity of background region 46.

Figure 3:
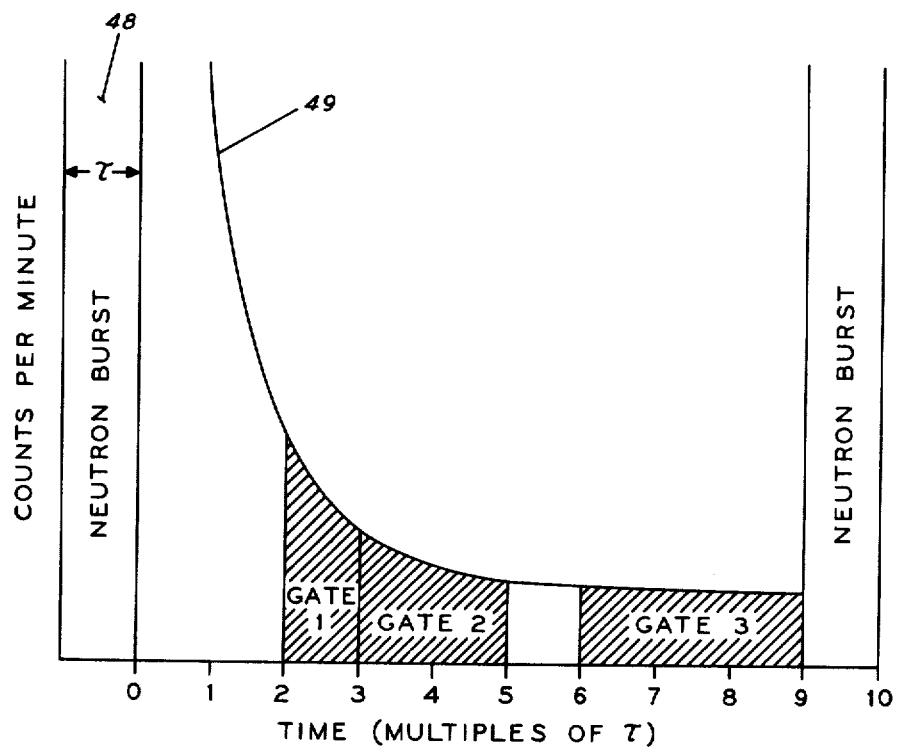

FIG. 3 illustrates to another method of gaining an indication of oxygen abundance of a surveyed reservoir by measuring only a component of signals associated with the background radiation of the pulsed-neutron-capture log.

Assume in FIG. 3 that the formation has been irradiated with a pulse of neutrons over a time $\tau$ in a region 48 which is varied to equal the measured exponential decay time for the disappearance of thermal neutrons. Note also that time $\tau$ is maintained by continuous corrections to provide a logic rule that curve 49 detected by the logging tool in the interval $2\tau$-$3\tau$ is equal to twice that in the interval $3\tau$-$5\tau$. Amplitudes of curve 49 are also determined, in part, from the signal measured during the time interval $6\tau$-$9\tau$, called the "Gate 3" signal. In this later time interval, the signal from thermal neutrons has decreased to less than 0.0025 times the original thermal neutron signal; so the intensity of the detected signal in this interval represents natural gamma radiation and radiation from the decay of unstable $N^{16}$ formed by neutron activation of $O^{16}$ nuclei. Thus the "Gate 3" response from the above-described logging tool from either the near or the far detectors thereof provides a signal that varies with the oxygen content of the fluids under survey. Time of neutron activation and signal recordation during one cycle of sliding-gate pulsed-neutron logs is, of course, directly proportional to time $\tau$. However, the number of pulses is inversely proportional to $\tau$. During any period containing a number of pulses, then the "Gate 3" response is independent of $\tau$. The sliding-gate pulsed-neutron log is commercially available and is described in detail in *Transactions of the Society of Professional Well Log Analysts*, "Thermal Neutron Decay Time Logging Using Dual Detector", J. T. Dewan, C. N. Johnstone, L. A. Jacobson, W. B. Wall, and R. P. Alger, 1973.

Recorded background response of the log of FIG. 2 as well as the "Gate 3" response of the sliding-gate pulsed-neutron log of FIG. 3 can be characterized by Equation 1:

$$SO = \alpha_1 + \alpha_2 f(\text{oxygen}) \tag{1}$$

wherein
SO is the measured response for a certain logging speed at a certain depth;
$\alpha_1$ is a constant reflecting gamma radiation whose origin is not activated oxygen radiation, which includes both natural gamma radiation as well as radiation from activated nuclei other than oxygen;
$\alpha_2$ is a constant reflecting source strength and detector sensitivity to gamma radiation emitted by the unstable $N^{16}$ nucleus that results from activation of $O^{16}$; and
$f$ (oxygen) is some function of the oxygen content in the well, the casing cement (if the well is cased), the reservoir rock, and the fluids contained in the formation.

Referring specifically to Equation (1), it should be noted that the constants $\alpha_1$ and $\alpha_2$ are sensitive to source strength, detector sensitivity and logging speed, and thus are different (in an absolute sense) for the different logs depicted in FIGS. 2 and 3. It is necessary to take steps to insure that these parameters remain constant for successive runs, such as by checking and adjusting logging parameters while the tool is at depths where saturations are not to be changed during the measurement process. The function $f$ (oxygen) will probably not be simply proportional to the overall oxygen content of the material in the well, the casing, and the formation, because each logging tool has different sensitivity to matter at different distances. The pulsed-neutron-capture log is designed to minimize the signal from matter near the tool, however; field experience has moreover shown that well bore fluids and casing cement can influence measurements by the tool; so the signal therefrom cannot be ignored. For the measurement process of the present invention, however, it is necessary only that changes in log response to proportional to changes in oxygen content in the fluids in the formation if all other factors are held constant. Use of background radiation data from pulsed-neutron-capture log responses in the manner of FIGS. 2 and 3 have several additional benefits: (1) existing tools have been developed small enough to be run in tubing, (2) the primary pulsed-neutron-capture log response is also available for supplementary measurements such as porosity measurement, and (3) depth of investigation is greater.

Oxygen Logs Specifically Designed to Record Oxygen

Neutron-activation logging to measure the oxygen content of the formation is also available, and one system is proposed in U.S. Pat. No. 3,465,151 by A. H. Youmans. In that system, the neutron-activated radiation is sensed downhole in a manner that such radiation can be related to the oxygen content of the region around the well bore. The essential difference between such a log and the above-discussed background signal from pulsed-neutron-capture logs of FIG. 3 is that in a log specifically designed for oxygen measurement, more effort must be applied to exclude signals unrelated to oxygen content. In other words, radiation not associated with the decay of the unstable $N^{16}$ nucleus which is produced by interaction of high-energy neutrons with $O^{16}$ must be excluded. This is achieved by noting that such radiation in such logs dies away with a time constant of 7.3 seconds; thus it can be distinguished from other radiation on the basis of its persistence.

Since the uses of the present invention involve the difference between, rather than the absolute magnitudes of, log signals, the exclusion of unrelated signals is also of less importance. Therefore, logs specifically designed to measure oxygen activation are suitable for carrying out the method of the present invention. If source strength, detector sensitivity, and logging speed are constant, the signal from the oxygen log can be described by Equation (1), where SO represents the oxygen-log response. The parameters $\alpha_1$, $\alpha_2$, and $f$ (oxygen) have the same meanings discussed above but are related to the characteristics of an oxygen log.

Figure 4:
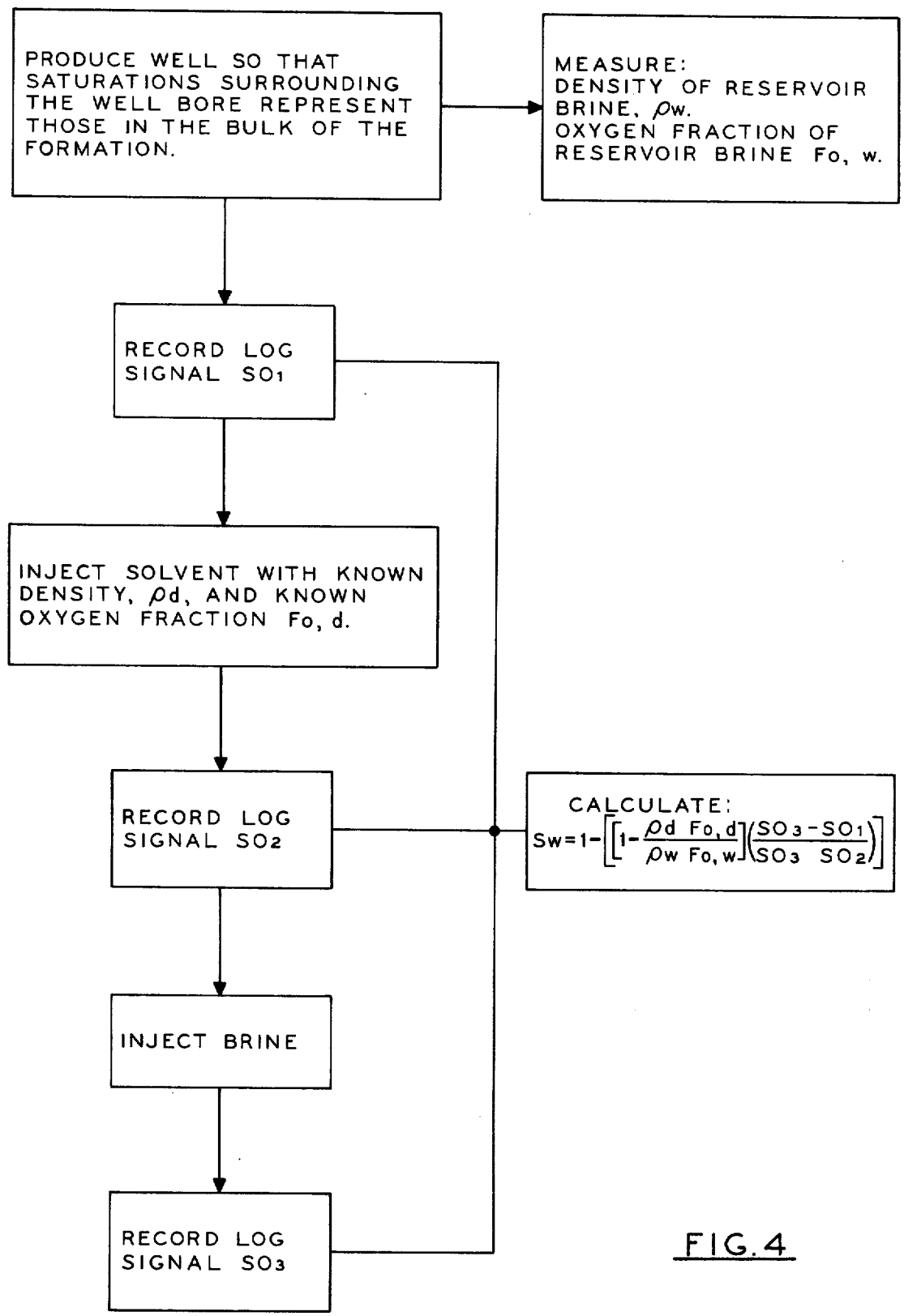
FIG. 4 is a schematic glock diagram illustrating the steps used in carrying out the method of the present invention.

FIG. 4 illustrates the steps of the present invention in detail.

While logging techniques are commercially available to measure parameters of interest related to formation and formation fluids about the well bore, it is necessary that steps be taken to insure that the fluid content of the region of interest reflects as nearly as possible the fluid content throughout the reservoir. Effects associated with rapid production can be minimized by producing the well slowly or by shutting-in the well to be logged for some time before the logs are recorded. After the water saturation in the vicinity of the well bore has been made equal to that in the reservoir, the formation can be logged by one of the several methods previously described. For ease of discussion, however, FIG. 4 reflects the operation of the present invention with the particular logging method: the pulsed-neutron-capture logging system.

In accordance with the present invention, the first step consists of logging the formation interval of interest to provide log signals $SO_1$. Thereafter, a purposeful change is made in the region by injecting into it fluid or fluids from source tank 17, FIG. 1, capable of removing all of the formation fluids. One process by which the formation fluids can be removed consists of injecting solvent followed by alcohol; a second consists of injecting a micellar solution preceded, if necessary, by sufficient fresh water to prevent emulsification of the solution. These techniques have been described for use with other well logging methods, for example, by R. P. Murphy, W. W. Owens, and D. L. Dauben in U.S. Pat. No. 3,757,575. For the measurement process herein described, it has been mentioned that the displacing fluid must have known properties. Specifically, it is necessary that the volume fraction of oxygen in the displacing fluid be known. If fluids of unknown composition are used, this fraction can be accurately measured with currently available laboratory techniques.

The next step consists of running the log a second time to provide the signal $SO_2$ of FIG. 4, while the displacing fluid is in the porous reservoir rock. Because part of the signal recorded by logging tools is determined by the fluid within the well bore, it is desirable to insure that this fluid is nearly the same for all logging runs.

The fourth step of the process consists of injecting brine from source tank 16 of FIG. 1 into the formation to insure that the solvent that displaced the formation fluids is itself placed into the formation beyond the region of tool response. The preferred brine for this step is produced brine of known characteristics.

The fifth step consists of recording the log response a third time when the formation is filled with brine to provide the log signal $SO_3$ of FIG. 4.

Calculations can then occur at the well site using the processor 37 in truck 32 of FIG. 1 to indicate water saturation. The basis of the calculations are set forth below.

The magnitude of a pulsed neutron log signal reflecting oxygen abundance can be represented by a more detailed form of Equation 1:

$$SO_1 = \alpha_1 + \alpha_2 f(\Omega_f, \Omega_c, \Omega_r, \Omega_{p,w1}) \qquad (2)$$

wherein $\Omega_f$ is the mass of oxygen contained in fluids in the well, $\Omega_c$ is the mass of oxygen contained in the cement casing;

$\Omega_r$ is the mass of oxygen contained in the reservoir rock; and $\Omega_{p,w1}$ is the mass of oxygen contained in the water in the porous part of the formation after the well is produced.

The magnitude of the second oxygen-related signal, $SO_2$, can be represented by Equation 3:

$$SO_2 = \alpha_1 + \alpha_2 f(\Omega_f, \Omega_c, \Omega_r, \Omega_{p,d}) \qquad (3)$$

where $\Omega_{p,d}$ is the mass of oxygen contained in the displacing agent which fills the porous rock at the time of the second logging run.

The magnitude of the oxygen-related signal from the third log, $SO_3$, can be represented by Equation 4:

$$SO_3 = \alpha_1 + \alpha_2 g(\Omega_f, \Omega_c, \Omega_r, \Omega_{p,w2}) \qquad (4)$$

where $\Omega_{p,w2}$ is the mass of oxygen contained in the water which now completely fills the porous part of the formation.

The oxygen content of the water in the porous reservoir at the time of the first set of logs, $\Omega_{p,w1}$, is described by Equation 5:

$$\Omega_{p,w1} = \phi \rho_w S_w F_{o,w} V \qquad (5)$$

wherein $\phi$ = the porosity of the formation;

$\rho_w$ = the density of the formation brine;

$f_{o,w}$ = the ratio of the mass of oxygen to the over-all mass of the formation brine;

$V$ = the effective volume sensed by the log; and $Sw$ = the water saturation representative of the reservoir.

The oxygen content of the displacing agent filling the porous reservoir when the second log is run, $\Omega_{p,d}$, can be represented by Equation 6:

$$\Omega_{p,d} = \phi \rho_D F_{o,D} V \qquad (6)$$

wherein $\rho$ = density of the displacing agent;

$F_{o,D}$ = ratio of the mass of oxygen to the over-all mass of the displacing agent.

The oxygen content of the porous reservoir filled with brine when the third log is run, $\Omega_{p,w2}$, can be represented by Equation 7:

$$\Omega_{p,w2} = \phi \rho_w F_{o,w} V \qquad (7)$$

Water saturations (Sw) can be computed at each depth from the differences in the log responses described above. The ratio between differences of recorded signals can be represented by Equations 8, 9 and 10:

$$\Omega \rho_{,\pi 2} = \phi \rho_w F_{o,w} V \qquad (8)$$

$$\frac{SO_3 - SO_1}{SO_3 - SO_2} = \frac{f(\Omega_f, \Omega_r, \Omega_r, \Omega \rho_{,\pi 2}) - f(\Omega_f, \Omega_r, \Omega_r, \Omega \rho_{,\pi 1})}{f(\Omega_f, \Omega_r, \Omega_r, \Omega \rho_{,\pi 2}) - f(\Omega_f, \Omega_r, \Omega_r, \Omega \rho_{,D})} \qquad (9)$$

$$= \frac{\frac{\delta_i}{\delta \Omega \rho}(\Omega \rho_{,\pi 2} - \Omega \rho_{,\pi 1})}{\frac{\delta_i}{2 \Omega \rho}(\Omega \rho_{,\pi 2} - \Omega \rho_{,D})}$$

$$= \frac{(\rho_w F_{o,w} - S_w \rho_w F_{o,w})}{(\rho_w F_{o,w} - \rho_D F_{o,D})}$$

$$= (1 - Sw) \frac{\rho_w F_{o,w}}{\rho_w F_{o,w} - \rho_D F_{o,D}}$$

$$\therefore Sw = 1 - \left[1 - \frac{\rho_d F_{o,d}}{\rho_w F_{o,w}}\right] \frac{SO_3 - SO_1}{SO_3 - SO_2} \qquad (10)$$

It is also evident that if the formation does not contain gas within the zone of interest then the oil saturation (So) can be inferred from Equationn 10, vis:

$$SO = 1 - SW = \left[1 - \frac{\rho_D F_{o,d}}{\rho_w F_{o,w}}\right] \frac{SO_3 - SO_1}{SO_3 - SO_2} \qquad (11)$$

It can be seen from the equations above that validity of the method claimed does not depend on the quantitative accuracy of the method for logging measurement of oxygen. The method is valid so long as changes in log responses are linearly proportional to changes in oxygen content throughout the range corresponding to changes in fluid content in the pore space.

Illustrative Example

The following is an example of the use of pulsed-neutron-capture log data to measure water saturation around a well. A waterflood in the field replaces an unknown fraction of the original formation brine by water with a different salinity. Economic evaluation of a proposed tertiary recovery program requires accurate determination of porosity, and inter alia, water saturation through a 20' interval. Determination is to be made from signals available from a sliding-gate pulsed-neutron-capture log.

Step number one consists of running the log in the well after production has terminated. The logging tool is run through the depth interval of interest a number of times in order to reduce statistical errors of the measured values. The average of the gate three ($F_3$) signals at a particular depth is 103.6 counts. The average capture cross section is 15.7 c. u. The latter value is not used in any of the calculations that follow, however, because the salinity of the brine in any particular part of the formation is unknown.

The second step is accomplished by the injection of a miscible solvent such as alcohol or methanol followed by enough isopropanol to insure complete displacement of the solvent several feet away from the well bore. This injection is accomplished by setting a plug below and a packer above the interval logged. After the injection step is completed, the packer is unseated and enough produced brine is injected to replace the alcohol in the annulus between tubing and casing. This insures that the same fluids are present within the well bore at each logging step so tht differences is logged values reflect only changes of the fluids in the formation.

The third step consists of a second running of the pulsed-neutron-capture log. Data are recorded through the interval of interest as well as an adjacent interval in order to confirm that efforts were successful in keeping logging panel settings and logging speeds the same as they were when the original sets of logs were recorded. From the multiple logging passes through the interval of interest, it is determined that at the particular depth the capture cross-section, $\Sigma_2$, is now 14.8 c. u., and the average gate three signal, $(F_3)_2$, is 82.0 counts.

Step number four consists of injection of approximately 100 bbls of brine of known capture cross-section into the formation. The salinity of the brine is chosen to be 50,000 ppm NaCl.

The final step consists of repeating the pulsed-neutron-capture log. The average capture cross-section measured at the particular depth of interest is now $\Sigma_3 =$ 19.6 c. u., and the average gate three signal is now $(F_3)_3 = 137.2$ counts.

In order to calculate the water saturations it is necessary to use the following constants:

density of isopropanol at reservoir temperature, $\rho d = 0.757$ q/cm$^3$
fractional mass of oxygen in isopropanol, $F_{o,d} = 0.266$
Thermal-neutron-capture cross-section of isopropanol, $\Sigma_d = 20.0$ c. u.
density of brine at reservoir temperature, $\rho_w = 1.027$ q/cm$^3$
fractional mass of oxygen in brine, $F_{o,w} = 0.855$
Thermal-neutron-capture cross-section of 50,000 ppm NaCl brine, $\Sigma_w = 40.0$ c. u.

Equation 10, supra, can be evaluated:

$$Sw = 1 - \left[\frac{137.2 - 103.6}{137.2 - 82.0}\right]\left(1 - \frac{0.757 * 0.266}{1.027 * 0.855}\right) = 0.531$$

Porosity can also be determined from the cross-sections measured by the pulsed-neutron-capture log:

$$\phi = \frac{19.6 - 14.8}{40.0 - 20.0} = 0.24$$

Modification

In some applications, it is possible to omit the last injection of brine surrounding the well bore and the subsequent logging of the fluids by the logging system depicted in FIG. 1. For the modification to be effective, it must be recognized from the data that a given depth interval in the well has properties substantially equivalent to the tested interval of interest and the former is known to contain no water. Water saturation is then calculated using the signal recorded in this region in place of the signals which would have been recorded after the final injection stage. Conversely, if oil saturation calculations in accordance with Equation 11 are to be carried out over the given depth interval supra, the region used for normalization purposes must be known not to contain oil. Oil saturation is then calculated using the signal recorded in that region in place of the normal $SO_3$ signals.

Also, replacement of the displacing fluid within the cased hole can often be accomplished by unseating the packer used to seal off the interval of interest and injecting produced brine. Since this brine is heavier than the displacing fluid, the lower part of the hole can be filled with the brine, without raising the pressure enough to cause its injection into the formation. It is often useful to put enough brine into the hole so that it fills the hole through not only the formation of interest but also another region in the hole. Logs recorded through this latter region can be used to check the log responses.

While specific embodiments of the invention have been described in detail, it should be understood that the invention is not limited thereto as many variations will be readily apparent to those skilled in the art, and thus the invention is to be given the broadest possible interpretation within the terms of the following claims.

What is claimed is:

1. A method of measuring the concentration of water in an earth formation constituting a given depth interval of a region surrounding a well bore, comprising:
  a. running, over said given depth interval, a log whose response to the oxygen content of said region is substantially linear throughout the range of expectable oxygen contents,
  b. injecting into said region a solvent capable of replacing substantially all formation fluids in the part of said region to which said log is responsive,
  c. running said log a second time to obtain signals changed from those of the first running, the changes reflecting the effects of Step (b),
  d. injecting brine to replace substantially all of said solvent within the part of said region to which said log is responsive,
  e. running said log a third time to obtain signals changed from those of the second running, the changes reflecting the effects of Step (d),
  f. calculating the water concentration from the measured difference in the signals from Steps (a), (c), and (e).

2. The method of claim 1 in which said response to said oxygen content is based on the detection of gamma rays resulting from the inelastic scattering of neutrons by oxygen nuclei.

3. The method of claim 1 in which said response to oxygen content is based on the detection of gamma rays resulting from neutron activation of oxygen nuclei.

4. The method of claim 1 in which possible changes in log sensitivity between logging runs are compensated for by recording log response through a depth interval in the well which is not affected by injected fluids.

5. The method of claim 1 in which the injection Steps (b) and (d) are followed by substeps in which the fluid within the well bore itself is restored to a composition having substantially the same effect on the log as did the fluid that was in said well bore during Step (a).

6. A method of measuring the concentration of water in an earth formation constituting a given depth interval of a region surrounding a well bore, comprising:
  a. running, over said given depth interval, a log whose response to the oxygen content of said region is substantially linear throughout the range of expectable oxygen contents, and running, over another depth interval known to contain substantially no water, the same said log,
  b. injecting into said region adjacent to said given depth interval a solvent capable of replacing substantially all of previous fluids in the part of said adjacent region to which said log is responsive,
  c. running said log over said given depth interval a second time to obtain signals changed from those of the first running, the changes reflecting the effects of Step (b),
  d. calculating the water concentration from the measured difference in the signals from Steps (a) and (c).

7. A method of measuring the concentration of water in an earth formation constituting a given depth interval of a region surrounding a well bore, comprising:
  a. running, over said given depth interval, a log whose response to the oxygen content of said region is substantially linear throughout the range of expectable oxygen contents,
  b. injecting into said region a solvent capable of replacing substantially all formation fluids in the part of said region to which said log is responsive,
  c. running said log a second time to obtain signals changed from those of the first running, the changes reflecting the effects of Step (b),
  d. injecting brine to replace substantially all of said solvent within the part of said region to which said log is responsive,
  e. running said log a third time to obtain signals changed from those of the second running, the changes reflecting the effects of Step (d),
  f. calculating the water concentration from the measured difference in the signals from Steps (a), (c), and (e), in accordance with the Equation:

$$S_w = 1 - \left[\left[1 - \frac{\rho_d F_{o,d}}{\rho_w F_{o,w}}\right] \left(\frac{SO_2 - SO_1}{SO_3 - SO_1}\right)\right]$$

wherein
  $SO_1$, $SO_2$ and $SO_3$ refer to log responses recorded in Steps (a), (c) and (e), respectively.
  $\rho_d$ = density of liquid in the formation after Step (b).
  $F_{o,d}$ = ratio of the mass of oxygen to the total mass of the above-specified liquid;
  $\rho_w$ = density of the formation brine; and
  $F_{o,w}$ = ratio of the mass of oxygen to the over-all mass of the formation brine.

8. A method of measuring the concentration of water in an earth formation constituting a given depth interval of a region surrounding a well bore, comprising:
  a. running, over said given depth interval, a log whose response to the oxygen content of said region is substantially linear throughout the range of expectable oxygen contents, and running, over another depth interval known to contain substantially no water, the same said log, b. injecting into said region adjacent to said given depth interval a solvent capable of replacing substantially all of previous fluids in the part of said adjacent region to which said log is responsive, c. running said log over said given depth interval a second time to obtain signals changed from those of the first running, the changes reflecting the effects of Step (b), d. calculating the water concentration from the measured difference in the signals from Steps (a) and (c), in accordance with the Equation:

$$Sw = 1 - \left[\left[1 - \frac{\rho_d F_{o,d}}{\rho_w F_{o,w}}\right]\left(\frac{SO_3 - SO_1}{SO_3 - SO_2}\right)\right]$$

wherein

SO$_1$ and SO$_2$ refer to recorded log responses at said given depth interval in Steps (a) and (c), respectively;

SO$_3$ refers to recorded log responses at said another depth interval known to contain substantially no water;

$\rho_d$ = density of liquid in the formation after Step (b);

$F_{o,d}$ = ratio of the mass of oxygen to the total mass of the above-specified liquid;

$\rho_w$ = density of the formation brine; and $F_{o,w}$ = the ratio of the mass of oxygen to the well mass of the formation brine.

9. A method of measuring the concentration of oil in an earth formation constituting a given depth interval of a region surrounding a well bore, comprising:

a. running, over said given depth interval, a log whose response to the oxygen content of said region is substantially linear throughout the range of expectable oxygen contents, b. injecting into said region a solvent capabale of replacing substantially all of the previous fluids in the part of said region to which said log is responsive, c. runing said log a second time to obtain signals changed from those of the first running, the changes reflecting the effects of Step (b), d. injecting brine to replace substantially all of said solvent within the part of said region to which said log is responsive, e. running said log a third time to obtain signals changed from those of the second running, the changes reflecting the effects of Step (d), f. calculating the oil concentration from the measured difference in the signals from Steps (a), (c), and (e).

10. The method of claim 9 in which said response to said oxygen content is based on the detection of gamma rays resulting from the inelastic scattering of neutrons by oxygen nuclei.

11. The method of claim 9 in which said response to oxygen content is based on the detection of gamma rays resulting from neutron activation of oxygen nuclei.

12. A method of measuring the concentration of oil in an earth formation constituting a given depth interval of a region surrounding a well bore, comprising:

a. running, over said given depth interval, a log whose response to the oxygen content of said region is substantially linear throughout the range of expectable oxygen contents, b. injecting into said region a solvent capable of replacing substantially all of the previous fluids in the part of said region to which said log is responsive, c. running said log a second time to obtain signals changed from those of the first running, the changes reflecting the effects of Step (b), d. injecting brine to replace substantially all of said solvent within the part of said region to which said log is responsive, e. running said log a third time to obtain signals changed from those of the second running, the changes reflecting the effects of Step (d), f. calculating the oil concentration from the measured difference in the signals from Steps (a), (c), and (e), in accordance with the Equation:

$$SO = \left[1 - \frac{\rho_d F_{o,d}}{\rho_w F_{o,w}}\right]\frac{SO_3 - SO_1}{SO_3 - SO_2}$$

wherein

SO$_1$, SO$_2$ and SO$_3$ refer to the log responses recorded in Steps (a), (c) and (e), respectively.

$\rho_d$ = density of liquid in the formation after Step (b);

$F_{o,d}$ = ratio of the mass of oxygen to the total mass of the above-specified liquid;

$\rho_w$ = density of the formation brine;

$F_{o,w}$ = ratio of the mass of oxygen to the over-all mass of the formation brine; and SO = fraction of the pore volume containing oil.

13. A method of measuring the concentration of oil in an earth formation constituting a given depth interval of a region surrounding a well bore, comprising:

a. running, over said given depth interval, a log whose response to the oxygen content of said region is substantially linear throughout the range of expectable oxygen contents, and running, over another depth interval known to contain substantially no oil, the same said log, b. injecting into said region adjacent to said given depth interval a solvent capable of replacing substantially all of the previous liquids in the part of said adjacent region to which said log is responsive, c. running said log over said given depth interval a second time to obtain signals changed from those of the first running, the changes reflecting the effects of Step (b), d. calculating the water concentration from the measured difference in the signals from Steps (a) and (c).

14. A method of measuring the concentration of oil in an earth formation constituting a given depth interval of a region surrounding a well bore, comprising:

a. running, over said given depth interval, a log whose response to the oxygen content of said region is substantially linear throughout the range of expectable oxygen contents, and running, over another depth interval known to contain substantially no oil, the same said log, b. injecting into said region adjacent to said given depth interval a solvent capable of replacing substantially all of the previous liquids in the part of said adjacent region to which said log is responsive, c. running said log over said given depth interval a second time to obtain signals changed from those of the first running, the changes reflecting the effects of Step (b), d. calculating the water concentration from the measured difference in the signals from Steps (a) and (c), in accordance with the Equation:

$$SO = \left[1 - \frac{\rho_d F_{o,d}}{\rho_w F_{o,w}}\right] \frac{SO_3 - SO_1}{SO_3 - SO_2}$$

wherein $SO_1$ and $SO_2$ refer to recorded log responses of said given depth interval in Steps (a) and (c), respectively;

$SO_3$ refers to the recorded log responses of said another depth interval containing no oil;

$\rho_d$ = density of liquid in the formation after Step (b);

$F_{o,d}$ = ratio of the mass oxygen to the total mass of the above-specified liquid;

$\rho_w$ = density of the formation brine;

$SO$ = fraction of the pore volume containing oil;

$F_{o,w}$ = ratio of the mass of oxygen to the over-all mass of the formation brine.

* * * * *